United States Patent
Weagant

[19]

[11] Patent Number: 6,049,301

[45] Date of Patent: Apr. 11, 2000

[54] SURVEILLANCE APPARATUS AND METHOD FOR THE DETECTION OF RADIO RECEIVERS

[75] Inventor: George A. Weagant, deceased, late of Maple Valley, Wash., by Phyllis M. Weagant, legal representative

[73] Assignee: The Boeing Company, Seattle, Wash.

[21] Appl. No.: 05/725,483

[22] Filed: Sep. 22, 1976

[51] Int. Cl.[7] .............................. G01S 13/06; G01S 13/66
[52] U.S. Cl. ................................. 342/13; 342/20; 342/90; 342/97; 342/107; 342/140; 342/99
[58] Field of Search ............................ 343/18 E; 342/13, 342/14, 16, 17, 18, 19, 20, 56, 89, 90, 97, 99, 107, 113, 140

[56] References Cited

U.S. PATENT DOCUMENTS

| | | | |
|---|---|---|---|
| 3,660,844 | 5/1972 | Potter | 342/20 |
| 3,706,931 | 12/1972 | Subramanian | 342/85 |
| 3,725,917 | 4/1973 | Sletten et al. | 342/193 |
| 3,732,567 | 5/1973 | Low et al. | 342/128 |
| 3,842,418 | 10/1974 | Lorber | 342/200 |
| 3,922,676 | 11/1975 | O'Berry et al. | 342/13 |
| 3,943,515 | 3/1976 | Miley | 342/17 |
| 4,017,855 | 4/1977 | Buck et al. | 342/16 |
| 4,031,535 | 6/1977 | Isbister | 343/18 D X |

*Primary Examiner*—John B. Sotomayor
*Attorney, Agent, or Firm*—John C. Hammar

[57] ABSTRACT

Method and apparatus for the detection of a target receiver unit such as an enemy radar or radio receiver is disclosed. The surveillance system of this invention includes a transmitter unit coupled to an antenna to establish an electromagnetic surveillance field that includes signal components at two predetermined surveillance frequencies. When a target receiver is located within the surveillance field, the target receiver produces a second electromagnetic field having signal components at the intermodulation products of the surveillance field signal components due to a nonlinear mixing process that occurs within the target receiver. Signal components at predetermined intermodulation frequencies are detected by a receiver circuit within the surveillance system that has a passband excluding signal components at the two predetermined surveillance frequencies. Since signals at the intermodulation frequencies are present only when a target receiver is presents detection is accomplished without the necessity of distinguishing between signals reflected from a target receiver and signals reflected from other obstacles.

10 Claims, 1 Drawing Sheet

SURVEILLANCE APPARATUS AND METHOD FOR THE DETECTION OF RADIO RECEIVERS

BACKGROUND OF THE INVENTION

This invention relates to the detection of receiving apparatus. More particularly this invention relates to methods and apparatus for detecting the presence and location of a receiver unit such as an enemy radar unit.

In many situations it is desirable and necessary to detect the presence of a receiver unit. For examples in electronic warfare a requirement often exists to detect the presence and location of an unfriendly radar unit or radio receiver (herein generally denoted as a target receiver). Although a target receivers or the structure in which it is housed, may present sufficient radar cross section to permit detection by ordinary radar surveillance, prior art radar systems have not been capable of adequately separating the signal reflected from the target receiver from the "clutter", i.e. signals reflected from other radar-reflective structure. Although attempts have also been made to detect the presence of an unfriendly radar unit, or other receiver-transmitter combinations (transceivers) by detecting the signals transmitted by the transceivers this technique first requires that the transmitter of the enemy transceiver be operating, and secondly requires either a priori knowledge of the enemy operating frequency or a rather complex system for monitoring a complete range of frequencies.

Accordingly, it is an object of this invention to provide a method and apparatus for detecting the presence of a target receiver unit that is free from the clutter problem which has beset the prior art.

It is another object of this invention to provide an electromagnetic surveillance system and method for detecting the presence of a target receiver unit that is effective even though the target receiver unit is not energized.

SUMMARY OF THE INVENTION

The foregoing and other objects are achieved in accordance with this invention by a surveillance system that includes a transmitter unit and antenna arranged to establish an electromagnetic surveillance field including electromagnetic wave components at two predetermined surveillliance frequencies. When a target receiver unit is located within the surveilling electromagnetic fields an electrical current having signal components at both surveillance frequencies is coupled from the antenna of the target receiver to the target receiver mixer stage. The two signal components undergo a modulation process within the target receiver mixer stage, whether the target receiver is activated or not, to form intermodulation products at frequencies having a known mathematical relationship to the two surveillance frequencies. A portion of the energy at the intermodulation frequencies is reflected within the target receiver circuitry and reaches the target receiver antenna to produce an electromagnetic field. Signal components of this electromagnetic field at predetermined intermodulation frequencies are detected by a receiver unit within the surveillance system. The passband of the surveillance receiver is established to accept signals at the predetermined intermodulation frequencies while excluding signal components at the two surveillance frequencies, thus avoiding the problem of clutter.

In some embodiments of this invention, the two surveillance frequencies are maintained fixed or constant. In certain other embodiments, the two surveillance frequencies are repetitively varied or swept over a predetermined frequency range to insure that the surveilling field will include signal components within the passband of circuit structure that may be interposed between the target receiver antenna and the target receiver mixer stage. Range detection is included within certain embodiments of this invention by employing conventional ranging techniques such as pulsed operation of the surveilling signal, frequency modulation of the surveillance signals or other signal encoding techniques. In some embodiments of the inventions the azimuth and/or elevation of a detected target receiver with respect to the surveillance system is provided by generating the electromagnetic surveillance field as a directional beam and scanning the antenna of the surveilling system to search a predetermined locality.

BRIEF DESCRIPTION OF THE DRAWINGS

Other objects and advantages of the present invention will become apparent to one skilled in the art after a reading of the following description taken together with the accompanying drawing in which.

DETAILED DESCRIPTION

Figure 1:
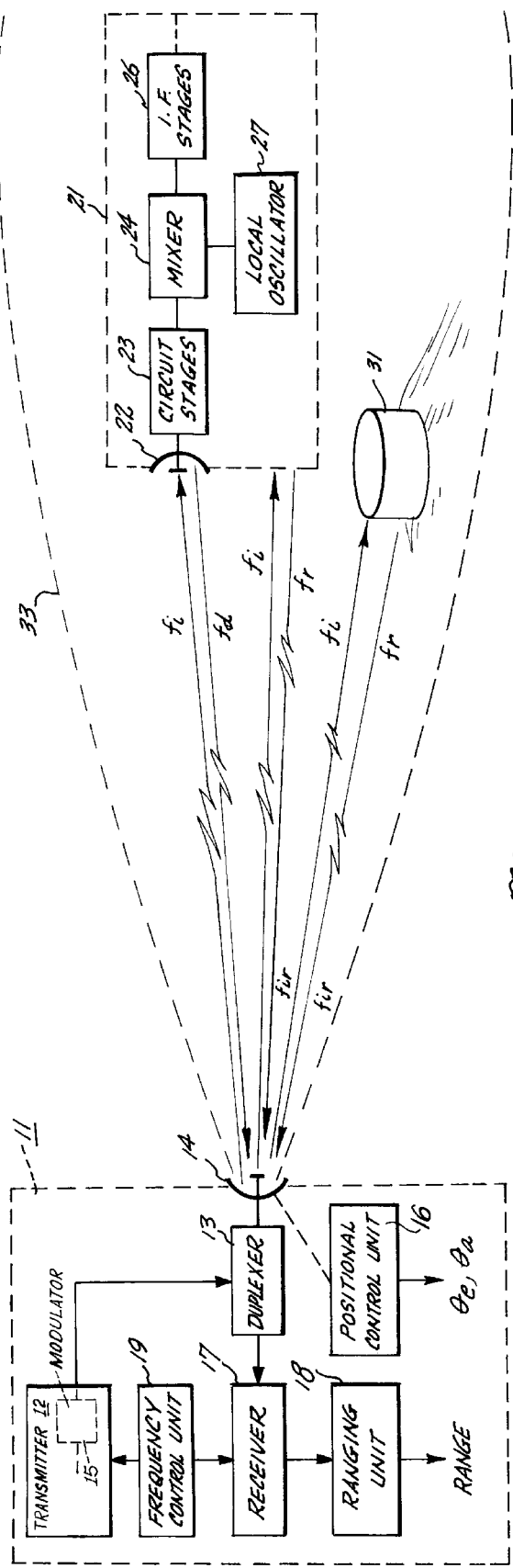
FIG. 1 diagrammatically depicts one embodiment of a surveillance system in accordance with this invention, operating to detect a target receiver unit in the presence of other signal reflective obstacles.

Referring to FIG. 1, surveillance system 11 includes a transmitter unit 12 that generates an electrical signal having two primary frequency components, $f_1$ and $f_2$. The generated signal is coupled to antenna 14 via duplexer circuit 13. In the embodiment of FIG. 1, antenna 14 is configured to generate a directional electromagnetic field or beam that is mechanically or electrically scanned over a predetermined surveillance region (denoted by dashed lines 33) by positional control unit 16. Portions of the electromagnetic wave established by surveillance system 11 (symbolically noted by the arrows labeled $f_t$) impinge on various reflective structure such as receiver unit 21 and obstacle 31. Both target receiver unit 21 and obstacle 31 reflect a portion of the impinging electromagnetic energy (symbolically denoted by the arrows labeled $f_r$). Although these reflected signals can be detected by surveillance system 11 and range, elevation and azimuth determined by conventional radio or radar techniques, the prior art has not established a practical method of distinguishing the signal reflected from receiver 21 from the signal reflected from other sources such as obstacle 31. Thus it can be recognized that prior art surveillance systems, that operate on conventional radar principles, are generally ineffective in locating a receiver unit such as an enemy radar installation since such a system cannot distinguish the signal representing the legitimate target from the surrounding "clutter" signals that are produced by any number of other signal reflective obstacles.

In the practice of this invention however, a detectable electromagnetic field that is unique to a target receiver is established. As depicted in FIG. 1, the surveilling electromagnetic wave of this invention also impinges on antenna 22 of target receiver 21. The impinging electromagnetic wave produces electrical currents within antenna 22 that are coupled to the electrical circuits of receiver 21. Although a variety of receiver circuit configurations may be encountered, conventional receiver circuits each include a mixer stage that mixes the signal supplied by the antenna with a signal supplied by a local oscillator stage to produce the receiver intermediate or IF frequencies. Referring to FIG. 1, which depicts a portion of a conventional receiver circuit that is commonly identified as the receiver front ends electrical signals including frequency components at frequencies $f_1$ and $f_2$ are produced by antenna 22. These signals are coupled through receiver stages 23 to mixer circuit 24. Although receiver stages 23 may include a variety of circuits such as a transmit-receiver switch, a duplexer circuit, directional couplers, and/or filter circuits, signals at frequencies $f_1$ and $f_2$ will be injected into mixer stage 24 as long as $f_1$ and $f_2$ are both within the passband of the structure included within receiver stages 23.

As is understood in the art, a conventional mixer circuits such as mixer stage 24 of FIG. 1, may be classified as a 3-port electrical network having a nonlinear transfer characteristic with respect to the electrical parameters of input signals applied to two input ports and the electrical parameters of the output signal taken at the third circuit port. For example, in the normal operation of receiver 21 of FIG. 1, a receive signal, $V_r$ is coupled to mixer stage 24 from antenna 22 and a local oscillator input signal, $V_{lo}$, is coupled to mixer stage 24 from local oscillator stage 27. Since the transfer characteristic of mixer stage 24 is nonlinear, e.g. $i_0/V_{in}$ is a nonlinear function where $i_0$ is the current coupled to the output port of mixer stage 24 and $V_{in}=V_r+V_{lo}$, signals $V_r$ and $V_{lo}$ undergo a modulation process which produces a mixer output signal having signal components at the input frequencies, $f_{lo}$, $f_r$; at the first sum and difference or side band frequencies $f_r \pm f_{lo}$; and at the intermodulation frequencies $mf_r \pm nf_{lo}$ where n and m are integers and m+n is an odd integer. Although mixer circuits for conventional receivers are generally designed to maximize the first difference frequency $f_r-f_{lo}$, and are further designed to maximize the power transferred through the mixer output port to the intermediate frequency stages, e.g. IF stages 26 of FIG. 1, ideal generation of the single difference frequency and ideal power transfer are never achieved. Accordingly, signals at each of the frequencies produced within mixer stage 24 are reflected back to antenna 22 and are radiated from antenna 22 as an electromagnetic field.

With the conventional operation of target receiver unit 21 in mind, it can now be understood that in the practice of this invention an electromagnetic field having frequency components at the intermodulation products of the two surveillance signals is established by target receiver 21 regardless of whether target receiver local oscillator 27 is operating or not. As previously described, surveillance sytsem 11 causes electrical signals having signal components at predetermined frequencies $f_1$ and $f_2$ to be injected into the antenna port of mixer 24. Although these signals are introduced through a single input port of mixer 24, rather than being separately injected via the antenna port and the local oscillator port, the nonlinear mixing process will still occur as long as the signal components at frequency $f_1$ and $f_2$ are of a magnitude sufficient to effect the nonlinear operation of mixer 24. Thus even though receiver 21 may be deactivated or "turned off", intermodulation signals at frequencies $mf_1 \pm nf_2$, where m and n are nonzero integers and m+n equals an odd integer are reflected to antenna 22 and radiated as an electromagnetic wave. These electromagnetic waves, symbolically denoted by the arrow labeled $f_d$ in FIG. 1, reach antenna 14 of surveillance system 11 where they are converted to electrical signals. These electrical signals are coupled through duplexer 13 to receiver 17, which may be any conventional receiver circuit that can be tuned to one or more of the intermodulation frequencies while simultaneously rejecting the signal components at $f_1$ and $f_2$. Since intermodulation frequencies will only be present when a target receiver is present within electromagnetic surveillance field 33 and receiver 17 is insensitive to signal components at the frequencies $f_1$ and $f_2$, detection of a target receiver is achieved free from the interfering clutter produced by other reflective structure within electromagnetic surveillance region 33.

Figure 2:
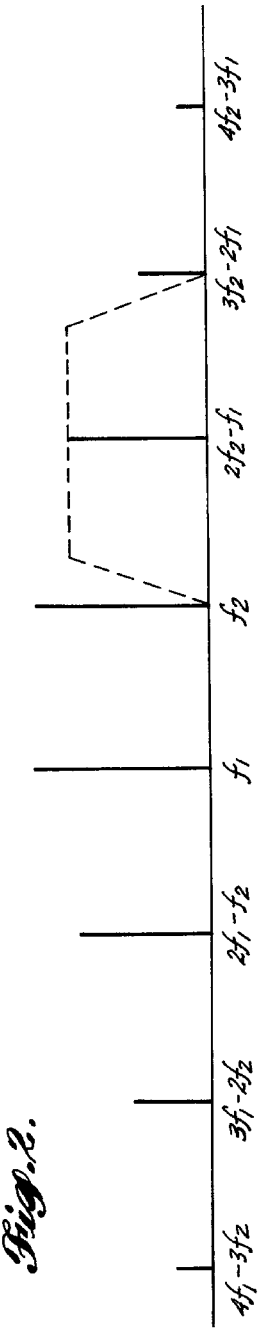
FIG. 2 illustrates the primary frequency components of electromagnetic signals encountered in the surveillance system of this invention.

The signal relationships of this invention are further illustrated by FIG. 2 which depicts typical signals recieved at surveillance antenna 14 for a transmitted signal having signal components at frequencies $f_1$ and $f_2$. As can be seen in FIG. 2, the intermodulation frequencies are uniformly spaced throughout the frequency spectrum on an interval equal to the magnitude of $f_2-f_1$, with the magnitude of the intermodulation signal component decreasing with an increase in the order of the intermodulation product. In the practice of this inventions it is generally preferable to tune surveillance receiver 17 to include signal components at either $2f_1-f_2$ or $2f_2-f_1$, since the signal components at either of these frequencies will be relatively strong and further, since each of these signals will generally fall within the passband of any band-limited structure included within the circuit stage 23 of a target receiver 21. In FIG. 2, the band width of surveillance receiver 17 is depicted as being substantially centered about intermodulation frequency $2f_2-f_1$ with the total bandwidth being less than $f_2-f_1$ to exclude the signal components received at frequency $f_2$.

In many embodiments of the present inventions it is not only desirable to detect a presence of a target receiver unit, but it is also necessary or desirable to determine the positional coordinates of the detected receiver. The range or distance between surveillance system 11 and detected receiver 21 can be determined by utilizing conventional ranging techniques within this invention. Thus, although the preceding discussion treated the surveillance signal supplied by transmitter 12 as a continuous wave signal having frequency components at $f_1$ and $f_2$, a variety of conventional modulation techniques can be employed that will permit range determination. For example, the signal supplied by transmitter 12 can be pulsed or frequency modulated by appropriate circuitry within transmitter 12 (symbolically represented in FIG. 1 by the modulator 15), and the signals at each intermodulation frequency will be coherent with respect to the supplied signal. That is, since the signals reflected by mixer 24 are effectively formed by a modulation process, the intermodulation signals transmitted back to the surveillance system 11 will contain the same information or modulation as the surveillance signal supplied by transmitter 12. When the detected intermodulation signal is processed by surveillance receiver 17, signals proportional to the modulation of the detected signal are coupled to ranging unit 18. Ranging unit 18 can be any conventional unit suitable for utilization with the particular modulation employed within transmitter 12. For example, if transmitter 12 supplies a pulsed signals ranging unit 18 will include conventional range gating circuitry that effectively measures the elapsed time between the transmission of a particular pulse and the reception of the corresponding pulse of the detected intermodulation signal and will include circuitry that converts this elapsed time into a distance or range indication.

Azimuth and/or elevation coordinates are also determined within this invention by conventional techniques. For examples positional control unit 16 which controls the position of antenna 14 and hence the position of the directional electromagnetic field radiated by antenna 14, may be any conventional circuit that provides the desired angular control and may further include conventional circuitry for locking antenna 14 to a detected target receiver should either the detected receiver or the surveillance system be moving. In any case, positional control unit 16 provides signals indicative of the azimuth and/or elevation (denoted as $\theta_a$ and $\theta_e$, respectively in FIG. 1) of detected receiver 21 with respect to a reference coordinate of surveillance antenna 14. The range information detected by ranging unit 18 and the positional coordinates determined by positional control unit 16 can be displayed on a conventional display unit and/or may be coupled as input signals to another systems the computational unit of a weapon system that may be utilized to electronically jam or destroy the detected receiver unit.

As previously discussed, the detection of certain receiver units is dependent on utilizing a surveillance signal in which signal components $f_1$ and $f_2$ are within the passband of certain circuitry that may be interposed between antenna 22 and mixer stage 24 of the target receiver. Although the passband of target receivers is often adequate to permit utilization of predetermined frequencies $f_1$ and $f_2$ that are selected on the basis of a priority knowledge of the general frequency characteristics of the sought-after target receivers, in some situations it may be advantageous to repetitively sweep or vary the frequency characteristics of the surveilling signal throughout the previously discussed scanning operation. In such situations frequency control unit 19 of FIG. 1 controls the frequency of the two surveillance signals $f_1$ and $f_2$ while simultaneously tuning receiver 17 such that the passband of receiver 17 includes at least one corresponding intermodulation frequency. Often frequency control circuit 19 and transmitter 12 will include conventional circuits such as a voltage controlled oscillator activated by a function generator (e.g. a saw-tooth generator) to vary frequencies $f_1$ and $f_2$. In such an embodiment, receiver 17 can be "locked" to the corresponding intermodulation signal by varying the local oscillator signal of receiver 17 in the same manner as the surveillance signal is varied. Alternatively, receiver 17 may be constructed with the variable intermediate frequency circuitry which tracks the frequency changes of the surveillance signal. Although generally the frequencies of surveillance signals $f_1$ and $f_2$ will be varied between upper and lower frequency limits, the exact manner in which the signal is varied may take any number of forms. For examples the frequency difference $f_2-f_1$ may be maintained constant or may itself vary as $f_1$ and $f_2$ are varied. It will be realized by those skilled in the art that complex frequency variation may advantageously make the surveillance system more difficult for an enemy to detect and track.

It should be realized that the embodiment of FIG. 1 is the preferred embodiment of this invention in applications in which it is necessary or desirable to establish surveillance of a substantial spatial region and rather precisely determine the location of a detected receiver unit. Accordingly it should be apparent to those skilled in the art that various other embodiments of this invention are possible to meet various other requirements. For examples in situations in which it is only necessary to detect target receivers operating within a limited spatial regions it may not be necessary to scan surveillance antenna 14 and positional control unit 16 can be eliminated. In other applications where it is only necessary to detect the presence of target receivers, an omnidirectional antenna may be employed for surveillance antenna 14 and ranging unit 18 and positional control unit 16 can be eliminated. In any case, it will be understood that the practice of this inventions and every embodiment thereof, includes the generation of a surveillance signal having signal components at two predetermined frequencies and the detection of a signal at at least one frequency $mf_1 \pm nf_2$ where $f_1$ and $f_2$ are the predetermined frequencies of the surveillance field, m and n equals 0, ±1, ±2, . . . and m+n equals an odd integer.

What is claimed is:

1. An electromagnetic surveillance system for detecting the presence of receivers having non-linear demodulation elements in the input channels thereof within a predetermined surveillance region comprising:

signal generation means for supplying an electrical signal including signal components at a first and second predetermined frequency, said signal generation means including means for modulating said electrical signal;

means responsive to said electrical signal supplied by said signal generation means for establishing an electromagnetic surveillance field within a predetermined surveillance region, said electromagnetic surveillance field having signal components at said first and second predetermined frequencies;

means for detecting electromagnetic waves at frequencies which correspond to at least one intermodulation frequency of said first and second predetermined frequencies, said detecting means including means for excluding signals at said first and said predetermined frequencies; and ranging means responsive to said means for detecting electromagnetic waves for determining the distance from said electromagnetic surveillance system to a receiver unit causing said electromagnetic waves at said intermodulation frequencies.

2. The electromagnetic surveillance system of claim 1 wherein said electromagnetic surveillance field producing means supplies a directional radiation pattern and said surveillance system further comprises means for controlling the position of said directional electromagnetic radiation pattern to supply said predetermined surveillance region.

3. The electromagnetic surveillance system of claim 2 wherein said means for controlling said position of said directional electromagnetic radiation pattern compromises means for supplying a signal representative of the angular coordinates between a detected receiver having said non-linear elements in the input channels thereof and a reference coordinate of said electromagnetic surveillance system.

4. The electromagnetic surveillance system of claim 3 further comprising means for repetitively varying said first and second predetermined frequencies over a predetermined frequency range.

5. An electromagnetic surveillance system for determining the presence of a remote receiver unit having a non-linear mixer stage comprising:

a transmitter unit for supplying an electrical signal including a signal component at a first predetermined frequency, $f_1$, and a signal component at a second predetermined frequency, $f_2$, said transmitter unit including means for modulating said supplied signal;

a receiver unit including means for indicating the reception of an electrical signal at at least one of the frequencies $mf_1 \pm nf_2$ where n and m equal ±1, ±2, . . . and m+n equal an odd integer;

an antenna responsive to said electrical signal supplied by said transmitter unit for supplying an electromagnetic surveillance pattern, said antenna further responsive to an impinging electromagnetic wave for supplying an electrical signal at the frequency components of said impinging electromagnetic wave;

means for coupling said electrical signals supplied by said antenna to said receiver unit; and a ranging circuit responsive to the signal supplied by said receiver circuit for determining the distance between said surveillance system and said remote receiver unit.

6. The electromagnetic surveillance system of claim 5 wherein said predetermined electromagnetic surveillance pattern is a directional beam emanating from said antenna and said surveillance system further comprises means for controlling said antenna to sweep said directional beam over a predetermined surveillance regions said antenna controlling means supplying a signal indicative of the position of said directional beam.

7. The electromagnetic surveillance system of claim 6 further comprising frequency control means for repeititvely varying said first and second predetermined frequencies between predetermined frequency limits.

8. A method for detecting the presence of receiver unit comprising the steps of:

generating an electrical signal including signal components at a first and second predetermined frequency, modulating said electrical signal including said signal components at said first and second predetermined frequencies to supply a modulated electrical signal;

transmitting a modulated electromagnetic wave representative of said modulated electrical signal; and detecting the presence of electromagnetic waves at at least one frequency corresponding to an intermodulation product of said first and second predetermined frequencies, said step of detecting including the step of deriving signals proportional to the modulation of the detected electromagnetic waves to determine the distance to that receiver unit producing said electromagnetic waves including said intermodulation product.

9. The method of claim 8 further comprising the steps of:

transmitting said electromagnetic wave including said signal components at said first and second predetermined frequencies as a relatively narrow beam; and controlling the position of said relatively narrow beam to surveil a predetermined spatial region.

10. The method of claim 9 further comprising the step of continuously varying said first and second predetermined frequencies between predetermined upper and lower frequency limits.

\* \* \* \* \*